United States Patent

Pommer et al.

[15] 3,681,466
[45] Aug. 1, 1972

[54] CONTINUOUS PRODUCTION OF AXEROPHTHOL

[72] Inventors: Horst Pommer; Bernhard Seid, both of Ludwigshafen; Axel Nuerrenbach, Gruenstadt; Georg Klotmann, Ludwigshafen; Hans Grassner, Hidelberg, all of Germany

[73] Assignee: Badische Anilin- & Soda-Fabrik Akteingesellschaft, Ludwigshafen/Rhine, Germany

[22] Filed: Sept. 23, 1969

[21] Appl. No.: 860,438

[30] Foreign Application Priority Data

Sept. 24, 1968 Germany............P 17 93 479.1

[52] U.S. Cl. ............................................260/617 A
[51] Int. Cl. ........................C07c 29/00, C07c 33/00
[58] Field of Search................................260/617 A

[56] References Cited

UNITED STATES PATENTS 2,920,103  1/1960  Oroshinik..............260/617 A X

FOREIGN PATENTS OR APPLICATIONS 1,117,111  5/1962  Germany..................260/617 A
844,596    7/1952  Germany..................260/617 A

*Primary Examiner*—Howard T. Mars
*Attorney*—Johnston, Root, O'Keefe, Thompson and Shurtleff

[57] ABSTRACT

Continuous production of axerophthol by reaction of axerophthyl acetate with a lower alcohol using guanidine as transesterification catalyst in two stages, alkyl acetate and some of the excess alcohol being distilled off in the first stage and the remainder of the alcohol being removed in the second stage by distillation with a hydrocarbon as entrainer.

7 Claims, No Drawings

CONTINUOUS PRODUCTION OF AXEROPHTHOL

The present invention relates to a new continuous process for the production of axerophthol by transesterification of axerophthyl acetate with a lower alcohol.

It is generally known that axerophthyl acetate (vitamin A acetate) can be transesterified batchwise with alcohols, such as methanol and ethanol, in the presence of a basic catalyst, such as an alkali metal hydroxide or an alkaline earth metal hydroxide, or the corresponding carbonates or alcoholates, at temperatures of from 0° to 40° C into axerophthol (vitamin A alcohol) and the corresponding volatile esters which are continuously removed from the chemical equilibrium mixture.

In this method however the very sensitive axerophthol formed is unnecessarily exposed for a longtime not only to the reaction temperature but also to the alcohol which acts as a proton-active compound that converts the axerophthol irreversibly into undesirable products such as anhydrovitamin A or retrovitamin A. Various attempts to improve this method by varying reaction conditions have not produced any satisfactory results.

It is therefore the object of the present invention to improve the process for the production of axerophthol by transesterification of axerophthyl acetate with lower alcohols both from a technical and economical point of view, and in particular to carry out the process in such a way that the valuable axerophthol is not converted into undesirable derivatives.

We have now found that this object is achieved and the production of axerophthol by transesterification of axerophthyl acetate with lower alcohols using basic transesterification catalysts can be carried out by supplying axerophthyl acetate together with an alcohol and with guanidine as the transesterification catalyst continuously to a first column in which transesterification takes place at from 40° to 110° C, some of the excess alcohol and the alkyl acetate formed being removed from the equilibrium mixture by distillation, supplying the mixture of axerophthol, alcohol and guanidine formed as bottom product to a second column in which the alcohol is removed by azeotropic distillation with a hydrocarbon entrainer whose boiling point is from 50° to 120° C, and working up the mixture of axerophthol, hydrocarbon and guanidine formed as bottom product into axerophthol or using it direct for further reactions.

Especially suitable alcohols for the transesterification are those whose acetates volatilize easily, in particular methanol and in general aliphatic alcohols having up to four carbon atoms, i.e. lower alkonols.

Preferred hydrocarbons are n-hexane and n-heptane or petroleum ether fractions having the specified boiling range.

In a preferred embodiment of the process according to this invention a packed column is used for the transesterification reaction, a solution of axerophthyl acetate, the alcohol and guanidine being supplied continuously to the top and alcohol vapor to the bottom. The molar ratio of alcohol to axerophthyl acetate should preferably be from 6:1 to 12:1. About 10 to 30 percent by weight of the alcohol should be supplied with the axerophthyl acetate and the remainder in vapor phase to the column. The reflux ratio of the alcohol distilling off at the top is advantageously so adjusted that the molar ratio of alcohol to axerophthyl acetate is in the specified range throughout approximately the upper half of the column. Many variants are possible with this method. Thus for example it is possible to introduce the axerophthyl acetate with the alcohol and the guanidine at the lower third of the column instead of at the top.

The amount of guanidine is a catalytic amount, advantageously from 0.5 to 3 percent by weight of the axerophthyl acetate.

The bottom product leaving the first column, i.e. the mixture of axerophthol and alcohol containing guanidine, is then supplied to the upper portion of a second packed column kept at from 50° to 120° C through which it passes countercurrent to the vaporous hydrocarbon. A mixture of hydrocarbon and alcohol escapes overhead while a mixture of axerophthol and hydrocarbon containing guanidine collects at the bottom and can be worked up as usual or used in this form for further reactions.

Both columns (for the transesterification reaction and for expelling the alcohol) may be combined in one unit. The tower packings may be commercial rings, cylinders, gauze packing or saddles of inert material. Sieve-tray columns and bubble-cap columns may also be used instead of packed columns.

The residence times necessary to achieve substantially quantitative transesterification in the columns depend on their dimensions, on the relative proportions of the various components and on the fact that the bulk of the alkyl acetate is removed from the top of the first column and the bulk of the alcohol from the top of the second column. The optimal conditions can be easily determined in each case by simple preliminary experiment.

It is advantageous to use pressures of from 300 to 760 mm Hg, particularly atmospheric pressure and to use an inert gas atmosphere owing to the sensitivity of vitamin A compounds to oxidation.

Axerophthol is obtained in yields of more than 98 percent; what is more important, it is practically free from chemically related troublesome impurities, such as axerophthene and the like. The latter discovery is remarkable because the process according to this invention is carried out at higher temperatures than the prior art methods of obtaining axerophthol by transesterification of axerophthyl acetate. It should also be emphasized that the space-time yields which can be achieved are higher than in the prior art methods.

The following examples illustrate the invention.

EXAMPLE 1

A mixture of 1,340 g (4.1 moles) of axerophthyl acetate, 340 g (about 10.6 moles) of methanol and 10 g (0.17 mole) of guanidine is fed hourly to the upper part of a packed column and vaporous methanol is introduced at the rate of 900 g (about 28 moles) per hour into the lower part of the column.

A temperature gradient of from 64° to 54° C prevails from bottom to top in the column which has a length of 160 cm and an internal diameter of 5 cm and is packed with 0.5 cm Raschig rings. A mixture of 288 g of methyl acetate and 490 g of methanol is withdrawn per hour from the top of the column, and a mixture of 10 g of guanidine, 620 g of methanol, 1,160 g of vitamin A alcohol and a small amount of methyl acetate is withdrawn per hour from the bottom.

This mixture is passed to the upper part of a column 200 cm in length and 6 cm in width which is also packed with 0.5 cm Raschig rings, 4,200 g per hour of vaporous hexane, being introduced at the bottom. In this column a temperature gradient of from 69° to 56° prevails from bottom to top.

A mixture of 620 g of methanol and 1,750 g of hexane is obtained per hour as distillate and a solution of 1,160 g of axerophthol in 2,430 g of hexane which contains guanidine is withdrawn per hour from the bottom. Conventional working up gives axerophthol in a yield of 99 percent; the content of retrovitamin A, anhydrovitamin A and axerophthyl acetate is less than 1 percent.

All operations are carried out under an atmosphere of nitrogen.

EXAMPLE 2

The procedure of Example 1 is followed but with isopropanol as the alcohol and heptane as the hydrocarbon. The quantities and temperatures are varied as follows:

First column: isopropanol at the top 440 g; at the bottom 1160 g; temperature gradient 84° to 80° C.

Second column: feed at top: mixture of 1,160 g of axerophthol and 720 g of isopropanol; feed at bottom: 3,800 g of heptane; temperature gradient 100° to 82° C; hourly discharge at bottom: 1,160 g of axerophthol in 2,170 g of heptane.

The axerophthol is obtained in the same almost quantitative yield and in the same high purity as in Example 1.

What we claim is:

1. In a process for the production of axerophthol by transesterification of axerophthyl acetate with a lower alkanol using a basic transesterification catalyst, the improvement which comprises supplying axerophthyl acetate together with an excess of said alkanol and with a catalytic amount of guanidine as the transesterification catalyst continuously to a first column in which transesterification takes place at from 40° to 110° C, removing by distillation from the equilibrium mixture some of the excess alkanol together with the bulk of the alkyl acetate being formed in said first column, supplying the mixture of axerophthol, alkanol and guanidine formed as bottom product of said first column to a second column in which the bulk of the alkanol is removed by azeotropic distillation with a hydrocarbon entrainer whose boiling point is from 50° to 120° C, at pressures of 300 to 760 mm. Hg and recovering the mixture of axerophthol, hydrocarbon and guanidine formed as bottom product of said second column.

2. A process as claimed in claim 1 wherein the alcohol used is methanol.

3. A process as claimed in claim 1 wherein the transesterification is carried out in a packed column.

4. A process as claimed in claim 1 wherein the ratio of said alkanol to axerophthyl acetate in said first column is from 6:1 to 12:1.

5. A process as claimed in claim 1 wherein the amount of guanidine is 0.5 to 3% by weight of the axerophthyl acetate.

6. A process as claimed in claim 1 carried out in an inert atmosphere.

7. A process as claimed in claim 1 carried out at atmospheric pressure.

* * * * *

PO-1050
(5/69)

UNITED STATES PATENT OFFICE
CERTIFICATE OF CORRECTION

Patent No. 3,681,466          Dated August 1, 1972

Inventor(s) Pommer et al

It is certified that error appears in the above-identified patent and that said Letters Patent are hereby corrected as shown below:

Cover page, left hand column, line 9, "teingesellschaft" should read --------- tiengesellschaft ---------------------

Cover page, left hand column, line 7, "Hidelberg", should read --------------- Heidelberg  -------------------

Signed and sealed this 12th day of December 1972.

(SEAL)
Attest:

EDWARD M. FLETCHER, JR.                ROBERT GOTTSCHALK
Attesting Officer                       Commissioner of Patents